United States Patent
Park et al.

(10) Patent No.: US 12,505,501 B2
(45) Date of Patent: Dec. 23, 2025

(54) METHOD FOR PROVIDING IMAGE AND ELECTRONIC DEVICE FOR SUPPORTING SAME

(71) Applicant: SAMSUNG ELECTRONICS CO., LTD., Suwon-si (KR)

(72) Inventors: Chansik Park, Suwon-si (KR); Donghyun Yeom, Suwon-si (KR); Jaehun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 18/143,801

(22) Filed: May 5, 2023

(65) Prior Publication Data
US 2023/0274389 A1   Aug. 31, 2023

Related U.S. Application Data

(63) Continuation of application No. PCT/KR2021/015916, filed on Nov. 4, 2021.

(30) Foreign Application Priority Data

Nov. 23, 2020   (KR) .................. 10-2020-0157963

(51) Int. Cl.
  *G06T 3/40*  (2024.01)
  *G06T 5/92*  (2024.01)
  *G06T 7/13*  (2017.01)

(52) U.S. Cl.
  CPC .................. *G06T 3/40* (2013.01); *G06T 5/92* (2024.01); *G06T 7/13* (2017.01); *G06T 2207/20208* (2013.01)

(58) Field of Classification Search
  CPC .... G06T 3/40; G06T 5/92; G06T 7/13; G06T 2207/20208; G06T 5/50
  See application file for complete search history.

(56) References Cited

U.S. PATENT DOCUMENTS

2012/0219235 A1   8/2012   Solhusvik et al.
2015/0002704 A1   1/2015   Vidal-Naquet
(Continued)

FOREIGN PATENT DOCUMENTS

JP         6159298 B2    7/2017
JP      2019-207603 A   12/2019
(Continued)

OTHER PUBLICATIONS

International Search Report (PCT/ISA/210) issued by the International Searching Authority on Feb. 9, 2022 in International Patent Application No. PCT/KR2021/015916.
(Continued)

*Primary Examiner* — Jianxun Yang
(74) *Attorney, Agent, or Firm* — Sughrue Mion, PLLC

(57) ABSTRACT

Ann electronic device includes: a display; a memory storing instructions; and a processor operably coupled to the display and the memory, the processor being configured to execute the instructions to: obtain a first image to which high dynamic range (HDR) is applied and metadata corresponding to the first image, scale up or down, using a scaling ratio based on size information about a first size of the first image and a second size of a second image to be displayed on the display, the first image to a third image, obtain, based on the metadata, first information about a plurality of first areas of the first image, obtain second information about a plurality of second areas of the third image, based on the scaling ratio and the first information, and obtain the second image by performing tone mapping on the plurality of second areas using a tone mapping coefficient included in the metadata.

14 Claims, 12 Drawing Sheets

(56) References Cited

U.S. PATENT DOCUMENTS

| | | | |
|---|---|---|---|
| 2015/0245044 A1 | 8/2015 | Guo et al. | |
| 2016/0381398 A1* | 12/2016 | Saxena | H04N 21/816 |
| | | | 348/39 |
| 2017/0180759 A1 | 6/2017 | Mertens | |
| 2017/0200257 A1* | 7/2017 | Van Den Herik | G06T 3/20 |
| 2017/0353704 A1 | 12/2017 | Su et al. | |
| 2018/0025477 A1 | 1/2018 | Min et al. | |
| 2018/0218481 A1 | 8/2018 | Evans et al. | |
| 2019/0043233 A1* | 2/2019 | Kim | G06T 5/94 |
| 2019/0052908 A1 | 2/2019 | Mertens et al. | |
| 2019/0289335 A1 | 9/2019 | Grois et al. | |
| 2019/0362476 A1 | 11/2019 | Pytlarz et al. | |
| 2020/0134792 A1 | 4/2020 | Mandal et al. | |
| 2020/0193897 A1 | 6/2020 | Park et al. | |

FOREIGN PATENT DOCUMENTS

| | | |
|---|---|---|
| KR | 10-1954851 B1 | 3/2019 |
| KR | 10-2020-0004210 A | 1/2020 |
| KR | 10-2020-0074645 A | 6/2020 |

OTHER PUBLICATIONS

Written Opinion (PCT/ISA/237) issued by the International Searching Authority on Feb. 9, 2022 in International Patent Application No. PCT/KR2021/015916.

* cited by examiner

510 num_windows for(w = 1; w < num_windows; w++ ) {

511 {
  window_upper_left_corner_x[w]
  window_upper_left_corner_y[w]
  window_lower_right_corner_x[w]
  window_lower_right_corner_y[w]
}

513 {
  center_of_ellipse_x[w]
  center_of_ellipse_y[w]
  rotation_angle[w]
  semimajor_axis_internal_ellipse[w]
  semimajor_axis_external_ellipse[w]
  semiminor_axis_external_ellipse[w]
}

515 — overlap_process_option[w]

}

520 num_windows for(w = 1; w < num_windows; w++ ) {

521 {
  Meta conversion (window_upper_left_corner_x[w])
  Meta conversion (window_upper_left_corner_y[w])
  Meta conversion (window_lower_right_corner_x[w])
  Meta conversion (window_lower_right_corner_y[w])
}

523 {
  Meta conversion (center_of_ellipse_x[w])
  Meta conversion (center_of_ellipse_y[w])
  Meta conversion (rotation_angle[w])
  Meta conversion (semimajor_axis_internal_ellipse[w])
  Meta conversion (semimajor_axis_external_ellipse[w])
  Meta conversion (semiminor_axis_external_ellipse[w])
}

515 — overlap_process_option[w]

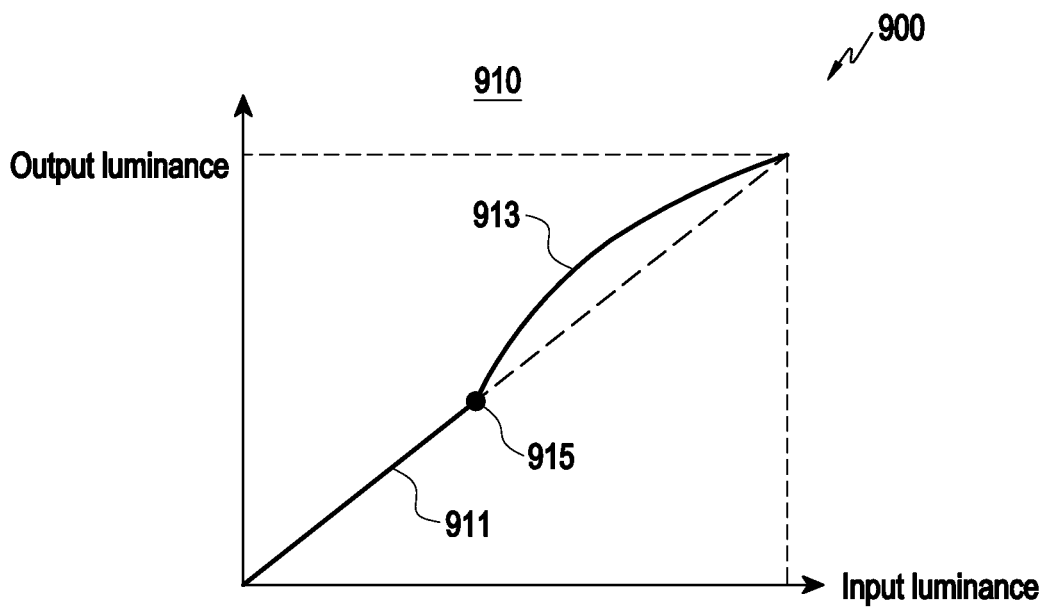
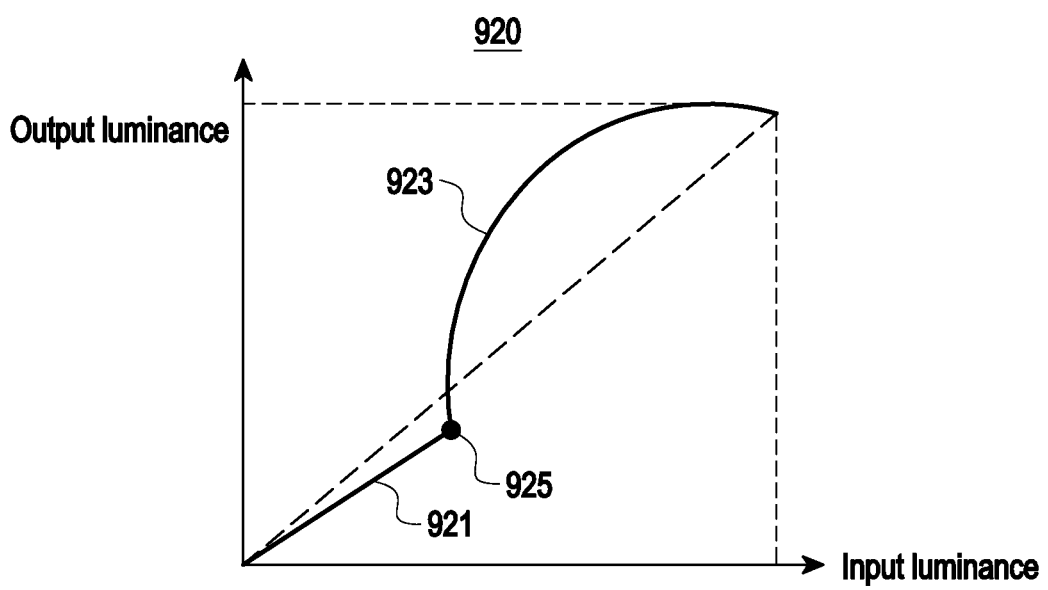
FIG. 9

METHOD FOR PROVIDING IMAGE AND ELECTRONIC DEVICE FOR SUPPORTING SAME

CROSS-REFERENCE TO RELATED APPLICATIONS

This application is a continuation application of International Application No. PCT/KR2021/015916, filed on Nov. 4, 2021, which claims priority to Korean Patent Application No. 10-2020-0157963, filed on Nov. 23, 2020, in the Korean Intellectual Property Office, the disclosures of which are incorporated by reference herein in their entireties.

BACKGROUND

1. Field

The disclosure relates to a method of providing an image and an electronic device supporting the same.

2. Description of Related Art

An electronic device for generating a high dynamic range (HDR) image (hereinafter, referred to as an "HDR image") and displaying the generated HDR image is under development. HDR is a technology of displaying an image close to a human-perceived object by distinguishing contrast more elaborately, when compared with other digital imaging techniques (e.g., standard dynamic range (SDR)).

HDR may be classified into one or more formats, such as, but not limited to, HDR10 in which image tone mapping may be uniformly applied to an entire sequence of an image by using static metadata and HDR10+(e.g., Dolby Vision) in which image tone mapping may be applied differently to each frame of an image by using dynamic metadata.

In HDR (e.g., HDR10+), a plurality of windows may be set in each frame of an image and different tone mapping may be performed on each of the plurality of windows.

Upon input (and/or receipt) of an HDR image, an electronic device (e.g., an HDR image-processing electronic device) may decode the input HDR image, and process (e.g., perform tone mapping on) the HDR image after scaling the decoded HDR image and/or scaling the HDR image after processing the HDR image.

In the case of scaling and then processing the decoded HDR image (e.g., scaling up and then processing the HDR image), more power may be consumed when compared to the case of processing and then scaling the HDR image. Accordingly, the electronic device process the HDR image after scaling the decoded HDR image.

However, for an HDR image including a plurality of windows in each frame, a method of scaling and then processing a decoded HDR image may not be known.

SUMMARY

Provided are a method of providing an image and an electronic device supporting the same, which may provide an improved image by converting the positions (e.g., coordinates) of a plurality of windows and performing corresponding tone mapping on the converted positions of the plurality of windows, in consideration of the size of an image to be displayed, in an HDR image including a plurality of windows in each frame.

Additional aspects will be set forth in part in the description which follows and, in part, will be apparent from the description, or may be learned by practice of the presented embodiments.

According to an aspect of the disclosure, an electronic device includes: a display; a memory storing instructions; and a processor operably coupled to the display and the memory, the processor being configured to execute the instructions to: obtain a first image to which high dynamic range (HDR) is applied and metadata corresponding to the first image, scale up or down, using a scaling ratio based on size information about a first size of the first image and a second size of a second image to be displayed on the display, the first image to a third image, obtain, based on the metadata, first information about a plurality of first areas of the first image, obtain second information about a plurality of second areas of the third image, based on the scaling ratio and the first information, and obtain the second image by performing tone mapping on the plurality of second areas using a tone mapping coefficient included in the metadata.

The first information may include first position information about positions of the plurality of first areas, the second information may include second position information about positions of the plurality of second areas, and the plurality of first areas and the plurality of second areas correspond to a plurality of tone mapping coefficients included in the metadata.

The processor may be further configured to execute the instructions to change, based on the scaling ratio, the positions of the plurality of first areas to the positions of the plurality of second areas, respectively.

The processor may be further configured to execute the instructions to: determine a boundary area including a boundary between the plurality of second areas, and determine a boundary tone mapping coefficient to be applied to the boundary area, based on respective tone mapping coefficients corresponding to the plurality of second areas, wherein one or more areas of the plurality of second areas include the boundary area.

The processor may be further configured to execute the instructions to determine an average value of tone mapping coefficients corresponding to the one or more second areas as the boundary tone mapping coefficient.

The processor may be further configured to execute the instructions to adjust a tone mapping coefficient value of the plurality of tone mapping coefficients corresponding to a low gray scale to a smaller value corresponding to the low gray scale.

The processor may be further configured to execute the instructions to adjust a tone mapping coefficient value of the plurality of tone mapping coefficients corresponding to a high gray scale to a larger value corresponding to the high gray scale.

The processor may be further configured to execute the instructions to: detect at least one of a viewing distance, a viewing angle, or an external illuminance, and adjust each of the plurality of tone mapping coefficients based on the at least one of the viewing distance, the viewing angle, or the external illuminance.

The processor may be further configured to execute the instructions to: determine whether the second size of the second image is greater than or equal to the first size of the first image, based on a determination that the second size is greater than or equal to the first size, obtain a fourth image by performing tone mapping on the first image, and obtain the second image by scaling up the fourth image.

According to an aspect of the disclosure, a method of providing an image by an electronic device, includes: obtaining a first image to which high dynamic range (HDR) is applied and metadata corresponding to the first image; scaling up or down, using a scaling ratio based on size information about a first size of the first image and a second size of a second image to be displayed on a display of the electronic device, the first image to a third image; obtaining, based on the metadata, first information about a plurality of first areas of the first image; obtaining second information about a plurality of second areas of the third image, based on the scaling ratio and the first information; and obtaining the second image by performing tone mapping on the plurality of second areas using a tone mapping coefficient included in the metadata.

The first information may include first position information about positions of the plurality of first areas, the second information may include second position information about positions of the plurality of second areas, and the plurality of first areas and the plurality of second areas correspond to a plurality of tone mapping coefficients included in the metadata.

The obtaining the second information may include changing, based on the scaling ratio, the positions of the plurality of first areas to the positions of the plurality of second areas, respectively.

The method may further include: determining a boundary area including a boundary between the plurality of second areas; and determining a boundary tone mapping coefficient to be applied to the boundary area, based on respective tone mapping coefficients corresponding to the plurality of second areas, one or more second areas of the plurality of second areas include the boundary area, and the determining the boundary tone mapping coefficient may include determining an average value of tone mapping coefficients corresponding to the one or more second areas as the boundary tone mapping coefficient.

The scaling the first image may include adjusting a tone mapping coefficient value of the plurality of tone mapping coefficients corresponding to a low gray scale to a smaller value corresponding to the low gray scale.

The scaling the first image may include adjusting a tone mapping coefficient value of the plurality of tone mapping coefficients corresponding to a high gray scale to a larger value corresponding to the high gray scale.

The method may further include: detecting at least one of a viewing distance, a viewing angle, or an external illuminance; and adjusting each of the plurality of tone mapping coefficients based on the at least one of the viewing distance, the viewing angle, or the external illuminance.

The method may further include: determining whether the second size of the second image is greater than or equal to the first size of the first image; based on determining that the second size is greater than or equal to the first size, obtaining a fourth image by performing tone mapping on the first image; and obtaining the second image by scaling up the fourth image.

According to an aspect of the disclosure, a non-transitory computer-readable storage medium stores computer-executable instructions for providing an image by an electronic device that, when executed by at least one processor of the electronic device, cause the electronic device to: obtain a first image to which high dynamic range (HDR) is applied and metadata corresponding to the first image; scale up or down, using a scaling ratio based on size information about a first size of the first image and a second size of a second image to be displayed on a display of the electronic device, the first image to a third image; obtain, based on the metadata, first information about a plurality of first areas of the first image; obtain second information about a plurality of second areas of the third image, based on the scaling ratio and the first information; and obtain the second image by performing tone mapping on the plurality of second areas using a tone mapping coefficient included by the metadata.

The first information may include first position information about first positions of the plurality of first areas, the second information may include second position information about second positions of the plurality of second areas, and the plurality of first areas and the plurality of second areas correspond to a plurality of tone mapping coefficients included by the metadata.

The computer-executable instructions, when executed by the at least one processor, further cause the electronic device to change, based on the scaling ratio, the first positions of the plurality of first areas to the second positions of the plurality of second areas, respectively.

According to one or more embodiments of the disclosure, a method of providing an image and an electronic device supporting the same may provide a more improved image by converting the positions (e.g., coordinates) of a plurality of windows and performing corresponding tone mapping on the converted positions of the plurality of windows, in consideration of the size of an image to be display, in an HDR image including a plurality of windows in each frame.

Further, according to one or more embodiments of the disclosure, a method of providing an image and an electronic device supporting the same may improve image contrast by adjusting the tone mapping coefficients of an HDR image so that a dark area of the image is displayed darker and a bright area of the image is displayed brighter.

Further, according to one or more embodiments of the disclosure, a method of providing an image and an electronic device supporting the same may obtain an image with better quality by adjusting the tone mapping coefficients of an HDR image based on at least one of a viewing distance, a viewing angle, or an external illuminance.

Further, according to one or more embodiments of the disclosure, a method of providing an image and an electronic device supporting the same may reduce power consumption by performing an image scale-up/scale-down operation and an HDR processing operation in a different order according to scale-up or scale-down of an HDR image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram illustrating a method of changing the positions of a plurality of first areas, according to various embodiments;

FIG. 9 is an exemplary diagram illustrating a method of performing tone mapping in the case of image scale-down, according to various embodiments;

DETAILED DESCRIPTION

Figure 1:
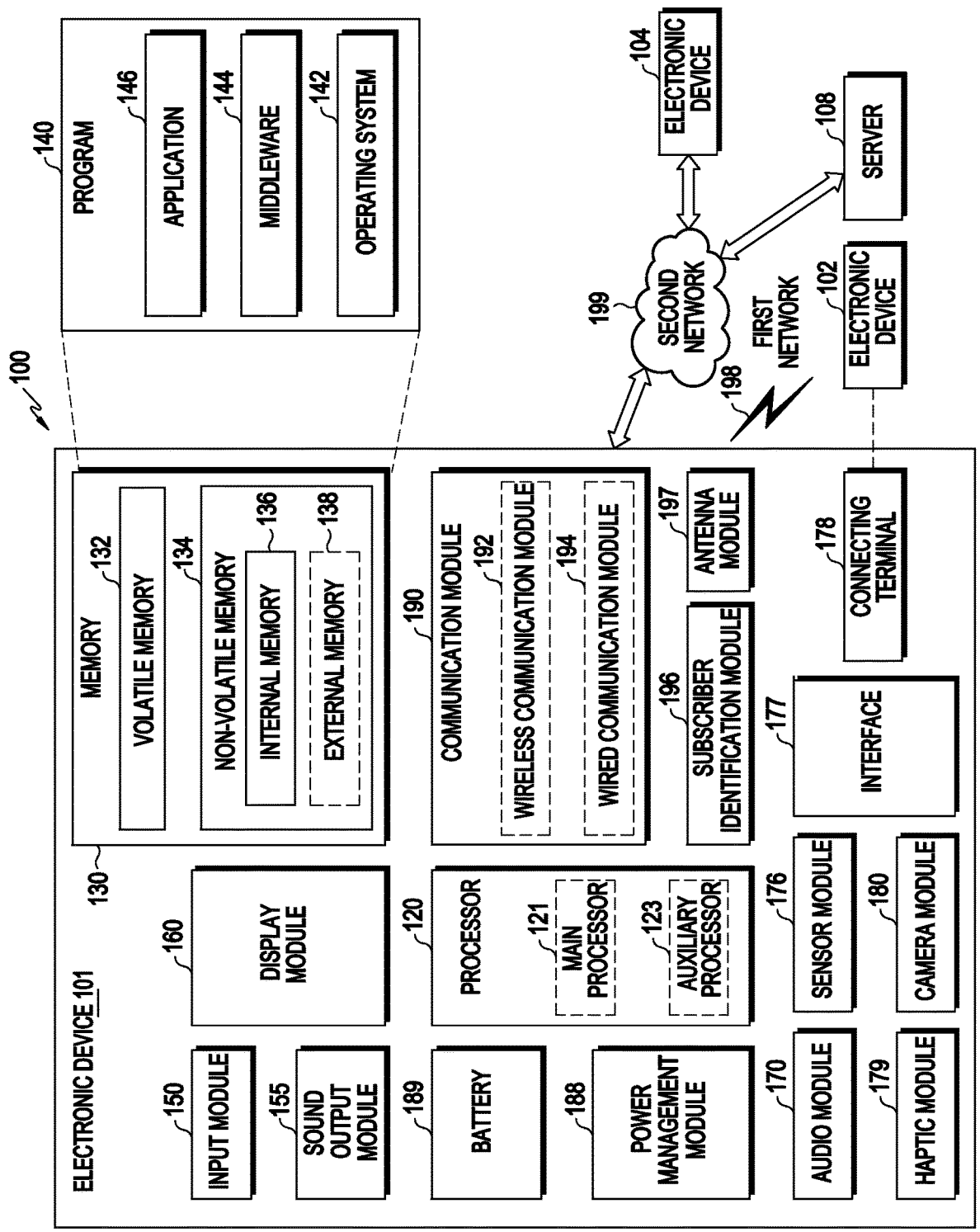
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
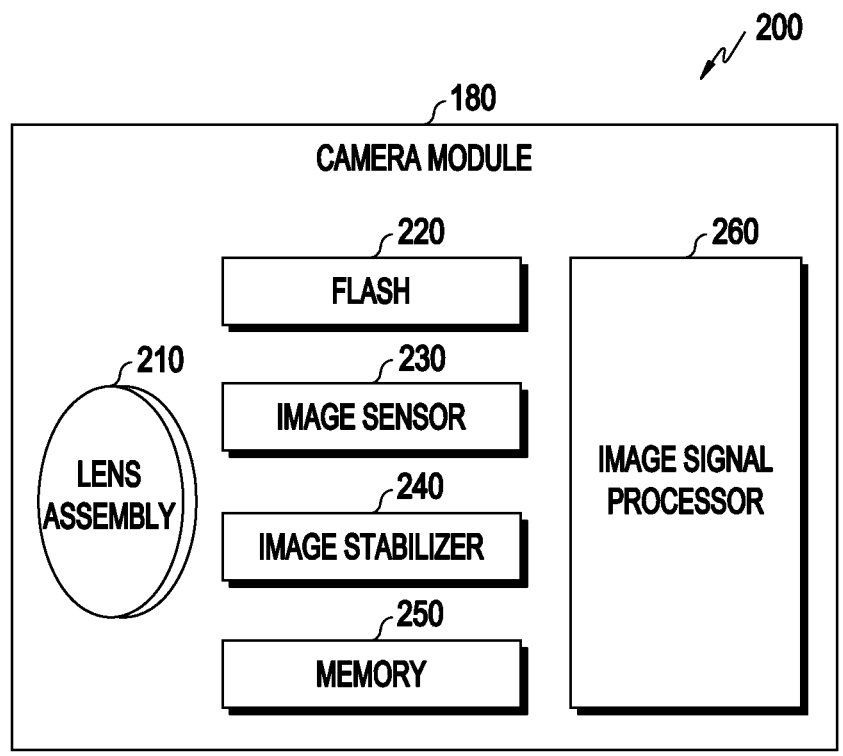
FIG. 2 is a block diagram illustrating an exemplary camera module, according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
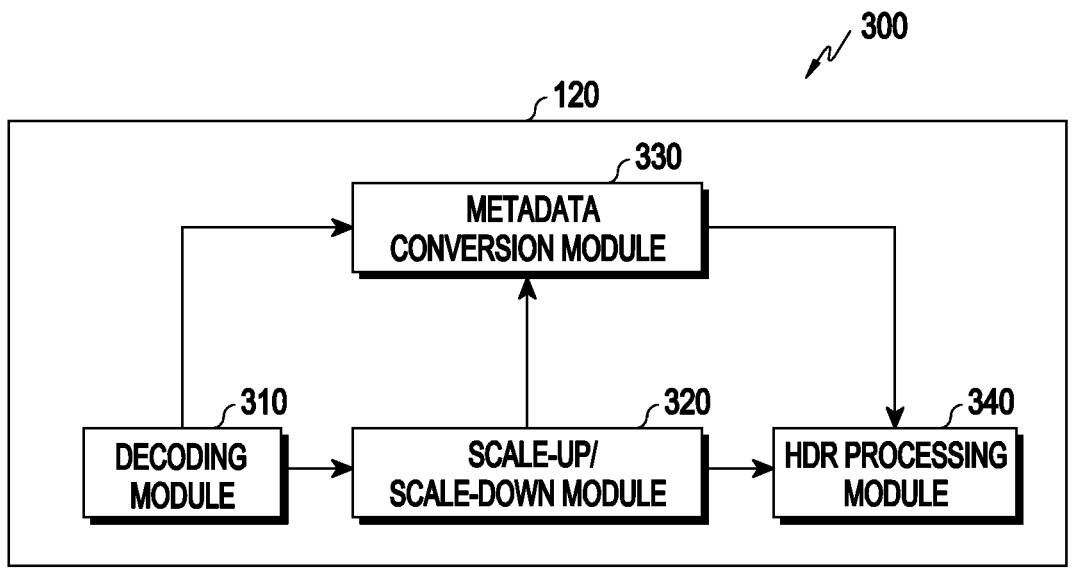
FIG. 3 is a block diagram illustrating an exemplary processor, according to various embodiments.

FIG. 3 is a block diagram 300 illustrating the processor 120 according to various embodiments.

Referring to FIG. 3, in an embodiment, the processor 120 may include a decoding module 310, a scale-up/scale-down module 320, a metadata conversion module 330, and an HDR processing module 340. In an embodiment, at least some of the decoding module 310, the scale-up/scale-down module 320, the metadata conversion module 330, and the HDR processing module 340 may be stored as software modules in memory and loaded by the processor 120 to be executed. In an embodiment, at least some of the decoding module 310, the scale-up/scale-down module 320, the metadata conversion module 330, and the HDR processing module 340 may be integrated with each other, and/or may be implemented as an integrated circuit, as software, and/or as a combination of circuits and software.

In an embodiment, the decoding module 310 may obtain a first image to which HDR is applied (hereinafter, referred to as a "first image") and metadata related to the first image (hereinafter, referred to as "metadata"). For example, the decoding module 310 may obtain an HDR image signal including an encoded first image and metadata from the outside (e.g., from a source external to the processor 120, such as but not limited to, the camera module 180). The decoding module 310 may obtain a first image by decoding the encoded first image included in the HDR image signal and obtain (and/or extract) the metadata by parsing the HDR image signal. In an embodiment, the first image includes a still image or moving images to which the HDR are applied. Further, hereinafter, an image (e.g., "second image", "third image, and/or "fourth image") may include a still image or moving images (e.g., video).

In an embodiment, the processor 120 may obtain the HDR image signal through the camera module 180. In an embodiment, the processor 120 may obtain the HDR image signal from an external electronic device (e.g., the server 108) and/or another electronic device (e.g., the electronic device 102 or the electronic device 104). For example, the HDR image signal may be obtained from the external electronic device in a real-time streaming method or a download method.

In an embodiment, the decoding module 310 may obtain the first image by decoding the first image in a decoding scheme corresponding to an encoding scheme of the first image. That is, the decoding module 310 may obtain an encoded first image, and the decoding module 310 may obtain the first image by decoding the encoded first image.

In an embodiment, the metadata may include dynamic metadata. For example, the metadata may include at least one of a color gamut, a color depth (or bit depth), a gamma value (e.g., at least one of an optical-electronic transfer function (OETF) or an electronic-optical transfer function (EOTF)), or data for tone mapping. In an embodiment, in HDR10+, operation metadata may be included in supplemental enhancement information (SEI).

In an embodiment, the data for tone mapping may include the positions (e.g., coordinates) of a plurality of areas (hereinafter, interchangeably used with 'a plurality of windows') set within a frame of the first image (e.g., one frame of the first image), and tone mapping coefficients corresponding to the plurality of areas, respectively.

In an embodiment, the tone mapping coefficients may include data necessary for obtaining a tone mapping function in the electronic device 101. For example, the tone mapping coefficients may include at least one of a maximum luminance of a mastering display (e.g., a display device that has generated an HDR image), a target display (e.g., a display device targeted during mastering), or the coordinates of at least one point (e.g., at least one of knee point coordinates or anchor (anchor point) coordinates) required to obtain (e.g., generate) a tone mapping function.

However, the information included in the metadata is not limited to the above example. For example, the metadata may further include information specified in an HDR-related standard, such as, but not limited to, American National Standard (ANSI)/Consumer Technology Association (CTA) CTA-861, Society of Motion Picture and Television Engineers (SMPTE) ST 2086 or Mastering Display Color Volume (MDCV), or SMPTE ST 2094-40 or Dynamic Metadata for Color Volume Transform (DMCVT).

In an embodiment, the decoding module 310 may transmit the obtained HDR image data to the scale-up/scale-down module 320 and transmit at least part of the obtained metadata to the metadata conversion module 330.

In an embodiment, the scale-up/scale-down module 320 may scale up or down (e.g., scale) the first image.

In an embodiment, the scale-up/scale-down module 320 may determine the size of the first image (or the resolution of the first image) (e.g., the horizontal length×vertical length of a frame of the first image) and the size of an image to be displayed (hereinafter, referred to as a "second image") (e.g., the resolution of the second image) through a display (e.g., the display module 160 of FIG. 1).

In an embodiment, the size of the second image may correspond to (e.g., be equal to) the size of the display (or the size of the entire screen of the display). In an embodiment, when the processor 120 receives an input for displaying the second image through a pop-up window, the size of the second image may correspond to (e.g., be equal to) the size of the pop-up window. In an embodiment, when the processor 120 receives an input for displaying a plurality of images through multi-windows (e.g., a plurality of windows displayed on one screen) from a user, the size of the second image may correspond to the size of a window in which the second image is to be displayed among the plurality of windows to be displayed on the display.

In an embodiment, the scale-up/scale-down module 320 may determine a ratio of the size of the second image to the size of the first image (hereinafter, referred to as a "scale-up/scale-down ratio") based on the size of the first image and the size of the second image.

In an embodiment, when the size of the first image is smaller than the size of the second image, the scale-up/scale-down ratio may be less than one (1) (e.g., ratio <1). Alternatively or additionally, when the size of the first image is greater than the size of the second image, the scale-up/scale-down ratio may be greater than one (1) (e.g., ratio ≥1).

In an embodiment, the scale-up/scale-down module 320 may transmit information about the scale-up/scale-down ratio (and/or information about the size of the first image and the size of the second image) to the metadata conversion module 330. In an embodiment, the scale-up/scale-down module 320 may transmit an image (hereinafter, referred to as a "third image") obtained through a scale-up or scale-down operation to the HDR processing module 340.

In an embodiment, the metadata conversion module 330 may change (and/or convert) the positions (e.g., coordinates) of a plurality of areas (e.g., a plurality of windows) (hereinafter, referred to as "a plurality of first areas") set in the first image to match the positions of a plurality of second areas of the third image (hereinafter, referred to as "a plurality of second areas") based on at least part of the metadata received from the decoding module 310 and the scale-up/scale-down ratio.

In an embodiment, the metadata conversion module 330 may obtain information about the plurality of first areas based on the metadata. For example, the metadata conversion module 330 may identify the positions of the plurality of first areas based on the metadata.

In an embodiment, the plurality of first areas set in the first image may correspond to (or be mapped to) a plurality of tone mapping coefficients, respectively in the metadata. For example, the plurality of first areas included in each of at least one of the frames of the first image may be set to respectively correspond to the plurality of tone mapping coefficients, during mastering for generating the first image. In an embodiment, the plurality of first areas may correspond to (e.g., be mapped to) the plurality of tone mapping coefficients in the metadata, respectively.

In an embodiment, the metadata conversion module 330 may obtain information about the plurality of second areas of the third image based on the scale-up/scale-down ratio and the information about the plurality of first areas. For example, the metadata conversion module 330 may change the positions of the plurality of first areas to match the positions of the plurality of second areas using the scale-up/scale-down ratio.

In an embodiment, when the positions of the plurality of first areas are changed to match the respective positions of the plurality of second areas, the plurality of second areas may correspond to the plurality of tone mapping coefficients of the plurality of first areas, respectively. For example, in the case where the plurality of first areas include a first area (e.g., a first window) corresponding to a first tone mapping coefficient and a second area (e.g., a second window) corresponding to a second tone mapping coefficient, when the first area is changed to a third area of the third image as the position of the first area is changed, and the second area is changed to a fourth area of the third image as the position of the second area is changed, the third area may correspond to the first tone mapping coefficient, and the fourth area may correspond to the second tone mapping coefficient.

In an embodiment, the metadata conversion module 330 may transmit information about the positions of the plurality of second areas to the HDR processing module 340.

As shown in FIG. 3, the metadata conversion module 330 is a module independent of (or separate from) the scale-up/scale-down module 320 and the HDR processing module 340. However, the present disclosure is not limited in this regard. For example, the metadata conversion module 330 may be included in the scale-up/scale-down module 320 and/or the HDR processing module 340.

A detailed description is given below of the operation of changing the positions of the plurality of first areas to the positions of the plurality of second areas based on at least part of the metadata received from the decoding module 310 and the information about the scale-up/scale-down ratio by the metadata conversion module 330.

In an embodiment, the HDR processing module 340 may perform an HDR processing operation. For example, the HDR processing module 340 may perform the HDR processing operation on the third image based on the information about the positions of the plurality of second areas from the metadata conversion module 330.

In an embodiment, the HDR processing module 340 may perform tone mapping. For example, the HDR processing module 340 may apply tone mapping coefficients corresponding to the plurality of second areas, to the plurality of the second areas, based on the information about the positions of the plurality of second areas. The tone mapping performed by the HDR processing module 340 is described below with reference to FIGS. 6 to 12.

In an embodiment, the HDR processing module 340 may convert a color gamut. For example, the HDR processing module 340 may convert a color gamut (e.g., a color gamut supported by a mastering display device) of the first image to a color gamut supported by the display of the electronic device 101 based on the metadata. However, when the color gamut of the first image is the same as the color gamut supported by the display of the electronic device 101, the HDR processing module 340 may not perform the color gamut conversion operation.

In an embodiment, the HDR processing module 340 may perform inverse transform of an OETF applied to the mastering operation of the first image using an EOFT. For example, the HDR processing module 340 may determine a transform function (e.g., perceptual quantization (PQ) gamma or hybrid log (HLG) gamma) based on the metadata. The HDR processing module 340 may perform the inverse transform using the transform function.

In an embodiment, the HDR processing module 340 may obtain the second image by performing HDR processing on the third image.

In an embodiment, the processor 120 may display the second image on the display.

Although FIG. 3 illustrates that HDR processing of the HDR processing module 340 follows the scale-up or scale-down operation of the scale-up/scale-down module 320 (e.g., the scale-up or scale-down of the first image to the third image), the present disclosure is not limited in this regard. For example, the HDR processing of the HDR processing module 340 may precede the scale-up or scale-down operation. Examples in which the HDR processing of the HDR processing module 340 precedes the scale-up or scale-down operation of the scale-up/scale-down module 320 are described below with reference to FIG. 12.

The electronic device 101 according to various embodiments of the disclosure may include a display (e.g., the display module 160), the at least one processor 120 operatively coupled to the display, and memory operatively coupled to the at least one processor 120. The memory 130 may include instructions which, when executed, cause the at least one processor 120 to obtain a first image to which HDR is applied and metadata related to the first image, scale up or down the first image to a third image based on information about a size of the first image and a size of a second image to be displayed on the display, obtain information about a plurality of first areas of the first image based on the metadata, obtain information about a plurality of second areas of the third image based on a ratio of scaling up or down the first image to the third image and the information about the plurality of first areas, and generate the second image by performing tone mapping on the plurality of second areas using a tone mapping coefficient included in the metadata.

In various embodiments, the information about the plurality of first areas may include information about positions of the plurality of first areas, the information about the plurality of second areas may include information about positions of the plurality of second areas, and the plurality of first areas and the plurality of second areas may correspond to a plurality of tone mapping coefficients included in the metadata.

In various embodiments, the instructions may cause the at least one processor 120 to change the positions of the plurality of first areas to match the respective positions of the plurality of second areas, based on the ratio of scaling up or down.

In various embodiments, the instructions may cause the at least one processor 120 to determine an area including a boundary between the plurality of second areas, and determine a tone mapping coefficient corresponding to the determined area using tone mapping coefficients corresponding to areas including the determined area among the plurality of second areas.

In various embodiments, the instructions may cause the at least one processor 120 to determine an average value of the tone mapping coefficients corresponding to the areas including the determined area among the plurality of second areas as a tone mapping coefficient to be applied to the determined area.

In various embodiments, the instructions cause the at least one processor 120 to, when the first image is scaled up or down to the third image, adjust a value of a tone mapping coefficient corresponding to a low gray scale and/or a value of a tone mapping coefficient corresponding to a high gray scale in each of the plurality of tone mapping coefficients.

In various embodiments, the instructions may cause the at least one processor 120 to, when the first image is scaled down to the third image, adjust the value of the tone mapping coefficient corresponding to the low gray scale of each of the plurality of tone mapping coefficients to a value smaller than a value of a tone mapping coefficient corresponding to the low gray scale and adjust the value of the tone mapping coefficient corresponding to the high gray scale of each of the plurality of tone mapping coefficients to a value greater than a value of a tone mapping coefficient corresponding to the high gray scale.

In various embodiments, the instructions cause the at least one processor 120 to detect at least one of a viewing distance, a viewing angle, or an external illuminance, and adjust each of the plurality of tone mapping coefficients based on the at least one of the viewing distance, the viewing angle, or the external illuminance.

In various embodiments, the instructions may cause the at least one processor 120 to, as the viewing distance increases, adjust the value of the tone mapping coefficient corresponding to the low gray scale to a value smaller than the value of the tone mapping coefficient corresponding to the low gray scale and adjust the value of the tone mapping coefficient corresponding to the high gray scale to a value greater than the value of the tone mapping coefficient corresponding to the high gray scale, in each of the plurality of tone mapping coefficients. In various embodiments, the instructions may cause the at least one processor 120 to, as the viewing angle increases, adjust the value of the tone mapping coefficient corresponding to the low gray scale to the value smaller than the value of the tone mapping coefficient corresponding to the low gray scale and adjust the value of the tone mapping coefficient corresponding to the high gray scale to a value greater than the value of the tone mapping coefficient corresponding to the high gray scale, in each of the plurality of tone mapping coefficients. In various embodiments, the instructions may cause the at least one processor 120 to, as the external illuminance increases, adjust the value of the tone mapping coefficient corresponding to the low gray scale to the value smaller than the value of the tone mapping coefficient corresponding to the low gray scale and adjust the value of the tone mapping coefficient corresponding to the high gray scale to a value greater than the value of the tone mapping coefficient corresponding to the high gray scale, in each of the plurality of tone mapping coefficients.

In various embodiments, the instructions cause the at least one processor 120 to determine whether the size of the second image is greater than or equal to the size of the first image, when the size of the second image is greater than or equal to the size of the first image, obtain a fourth image by performing tone mapping on the first image, and obtain the second image by scaling up the fourth image.

The electronic device 101 according to various embodiments of the disclosure may include a display (e.g., the display module 160), the at least one processor 120 operatively coupled to the display, and memory operatively coupled to the at least one processor 120. The memory 130 may include instructions which, when executed, cause the at least one processor 120 to obtain a first image to which HDR is applied and metadata related to the first image, scale up or down the first image to a third image based on information about a size of the first image and a size of a second image to be displayed on the display, obtain information about an area of the third image based on a ratio of scaling up or down the first image to the third image, adjust a first value of a tone mapping coefficient corresponding to a low gray scale of a tone mapping coefficient included in the metadata and/or a second value of a tone mapping coefficient corresponding to a high gray scale of the tone mapping coefficient, and obtain the second image by performing tone mapping on the area of the third image using a tone mapping coefficient including the adjusted first value and second value.

In various embodiments, the instructions cause the at least one processor to, when the first image is scaled down to the third image, adjust the first value to a value smaller than the first value and adjust the second value to a value greater the second value.

In various embodiments, the instructions cause the at least one processor to detect at least one of a viewing distance, a viewing angle, or an external illuminance, and adjust the first value and/or the second value based on the at least one of the viewing distance, the viewing angle, or the external illuminance.

In various embodiments, the instructions cause the at least one processor 120 to determine whether the size of the second image is greater than or equal to the size of the first image, when the size of the second image is greater than or equal to the size of the first image, obtain a fourth image by performing tone mapping on the first image, and obtain the second image by scaling up the fourth image.

Figure 4:
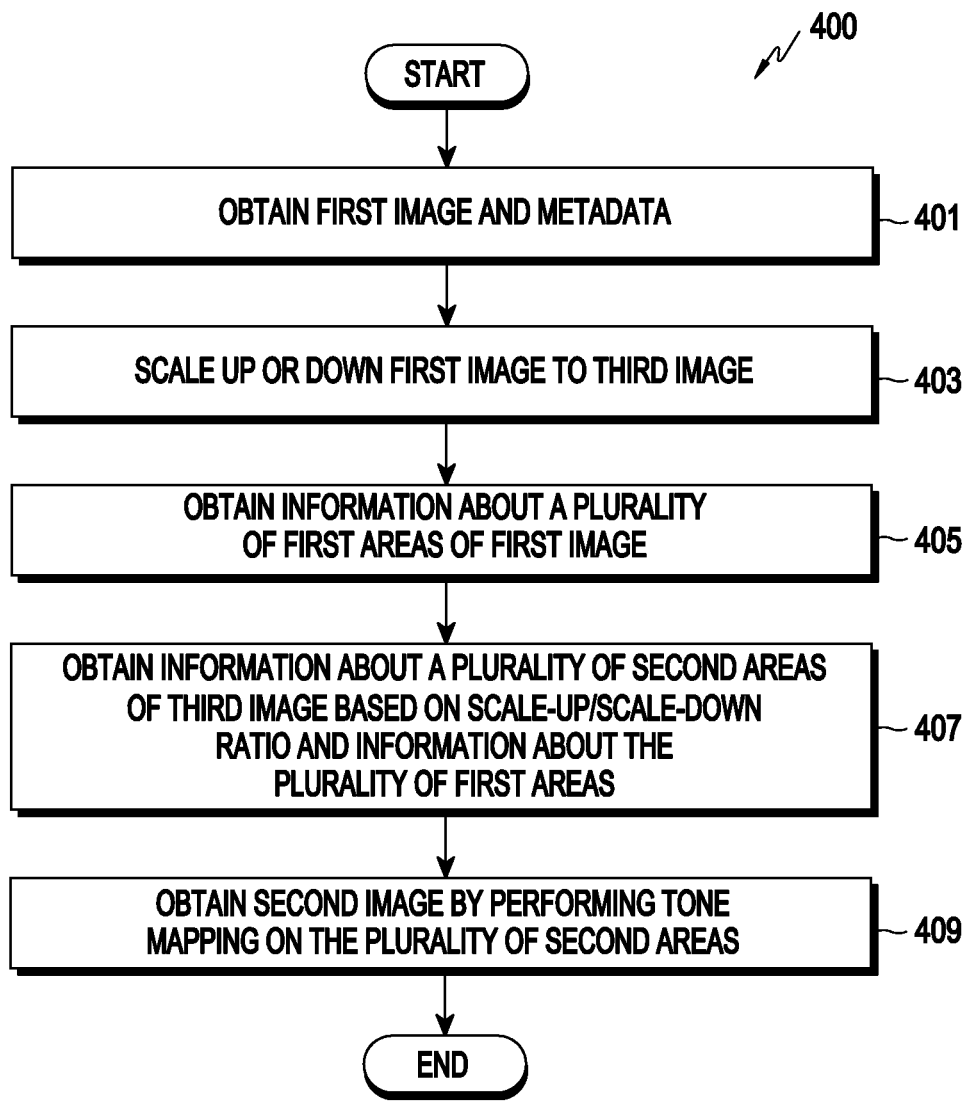
FIG. 4 is a flowchart illustrating a method of providing an image, according to various embodiments.

FIG. 4 is a flowchart 400 illustrating a method of providing an image according to various embodiments.

Referring to FIG. 4, in an embodiment, the processor 120 may obtain a first image and metadata in operation 401.

In an embodiment, the processor 120 may obtain an HDR image signal including an encoded first image and metadata from the outside (e.g., user, camera module, external electronic device, server). The processor 120 may obtain a first image by decoding the encoded first image included in the HDR image signal and obtain (and/or extract) the metadata by parsing the HDR image signal.

In an embodiment, the processor 120 may obtain the HDR image signal through the camera module 180. In an embodiment, the processor 120 may obtain the HDR image signal from an external electronic device (e.g., the server 108) and/or another electronic device (e.g., the electronic device 102 or the electronic device 104). For example, the processor 120 may obtain the HDR image signal from the external electronic device in a real-time streaming method and/or a download method.

In an embodiment, the processor 120 may obtain the first image by performing decoding using a decoding scheme corresponding to an encoding scheme of the first image.

In an embodiment, the metadata may include dynamic metadata. In an embodiment, the metadata may include at least one of a color gamut, a color depth (or bit depth), a gamma value, or data for tone mapping.

In an embodiment, the data for tone mapping may include the positions (e.g., coordinates) of a plurality of areas set in a frame of the first image (e.g., one frame of the first image) and tone mapping coefficients corresponding to the plurality of areas.

In an embodiment, the tone mapping coefficients may include data necessary for obtaining a tone mapping function in the electronic device 101. For example, the tone mapping coefficients may include at least one of the coordinates of at least one point (e.g., at least one of knee point coordinates or anchor point coordinates) required to obtain (e.g., generate) a maximum luminance of a mastering display, a maximum luminance of a target display, or a tone mapping function.

However, the information included in the metadata is not limited to the above example. For example, the metadata may further include information specified in an HDR-related standard, such as, but not limited to, CTA-861, SMPTE ST 2086, or SMPTE ST 2094-40.

In an embodiment, the processor 120 may scale up or down the first image to a third image in operation 403.

In an embodiment, the processor 120 may determine the size (and/or resolution) of the first image and the size (and/or resolution) of a second image to be displayed on the display.

In an embodiment, the size of the second image may correspond to (e.g., be equal to) the size of the display (or the entire screen of the display). In an embodiment, when the processor 120 receives an input for displaying the second image through a pop-up window, the size of the second image may correspond to (e.g., be equal to) the size of the pop-up window. In an embodiment, when the processor 120 receives an input for displaying a plurality of images through multi-windows (e.g., a plurality of windows displayed on one screen) from a user, the size of the second image may correspond to the size of a window in which the second image is to be displayed among the plurality of windows to be displayed on the display.

In an embodiment, the processor 120 may determine a scale-up/scale-down ratio based on the size of the first image and the size of the second image.

In an embodiment, the processor 120 may obtain information about a plurality of first areas of the first image in operation 405. For example, the processor 120 may identify the positions of the plurality of first areas of the first image corresponding to a plurality of tone mapping coefficients, based on the metadata.

In an embodiment, the plurality of first areas set in the first image may correspond to (and/or be mapped to) the plurality of tone mapping coefficients, respectively in the metadata. For example, the plurality of first areas included in each of at least one of the frames of the first image may be set to correspond to the plurality of tone mapping coefficients, respectively during mastering for generating the first image. In an embodiment, the plurality of first areas may correspond to (e.g., be mapped to) the plurality of tone mapping coefficients, respectively in the metadata.

In an embodiment, the processor 120 may obtain information about a plurality of second areas of the third image based on the scale-up/scale-down ratio and the information about the plurality of first areas in operation 407. For example, the processor 120 may change the positions of the plurality of first areas to the positions of the plurality of second areas using the scale-up/scale-down ratio.

In an embodiment, when the positions of the plurality of first areas are changed to match the respective positions of the plurality of second areas, the plurality of second areas may correspond to the plurality of tone mapping coefficients of the plurality of first areas, respectively. For example, in the case where the plurality of first areas include a first area (e.g., a first window) corresponding to a first tone mapping coefficient and a second area (e.g., a second window) corresponding to a second tone mapping coefficient, when the first area is changed to a third area of the third image as the position of the first area is changed, and the second area is changed to a fourth area of the third image as the position of the second area is changed, the third area may correspond to the first tone mapping coefficient, and the fourth area may correspond to the second tone mapping coefficient.

With reference to FIG. 5, a method of changing the positions of a plurality of first areas will be described in more detail.

FIG. 5 is a diagram 500 illustrating a method of changing the positions of a plurality of first areas according to various embodiments.

Referring to FIG. 5, in an embodiment, element 510 may denote information related to the positions of a plurality of first areas according to SMPTE ST 2094-40 of HDR10+, for example. In an embodiment, in element 510, num_windows may indicate the number of the plurality of first areas. Element 510 may denote a case in which at least some of the plurality of first areas have an elliptical shape. For example, when the number of the plurality of first areas is three (3) (e.g., when num_window is three (3)), a first window (e.g., a window with w=1) and a second window (e.g., a window with w=2) may be set in the form of ellipses, and while not indicated by 510, a third window (e.g., a window with w=0) may be set as the background of an image frame (or the entire area of the image frame). Elements 510, 511 and 513 may indicate the positions of the plurality of elliptical first areas. Element 515 may denote information indicating a method of combining the plurality of first areas (e.g., a weighted average method and a layering method).

In an embodiment, the processor 120 may change the positions of the plurality of first areas to match the respective positions of a plurality of second areas, based on a scale-up/scale-down ratio (and/or the size of a first image and the size of a second image). For example, when the scale-up/scale-down ratio is two (2), the processor 120 may multiply the x-coordinate and y-coordinate of each of the plurality of first areas by two (2) to obtain the x-coordinate and y-coordinate of each of the plurality of second areas. In an embodiment, element 520 may denote information related to the positions of the plurality of second areas. Elements 520, 521 and 523 may indicate the positions of the plurality of second areas to which the positions of the plurality of first areas are changed.

As shown in FIG. 5, some of the plurality of first areas may be elliptical in shape. However, the present disclosure is not limited in this regard. For example, the plurality of first areas may be set in various shapes.

Referring back to FIG. 4, in an embodiment, the processor 120 may obtain the second image by performing tone mapping on the positions of the plurality of second areas in operation 409. For example, the processor 120 may obtain the second image by performing tone mapping on the plurality of second areas based on the positions of the plurality of second areas and the plurality of tone mapping coefficients (e.g., the tone mapping coefficients corresponding to the plurality of second areas, respectively).

In an embodiment, the processor 120 may apply the tone mapping coefficients corresponding to the plurality of second areas to the plurality of second areas based on information about the positions of the plurality of second areas.

In an embodiment, processor 120 may perform HDR processing in addition to the tone mapping. For example, the processor 120 may convert a color gamut. The processor 120 may convert a color gamut of the first image (e.g., a color gamut supported by the mastering display device) to a color gamut supported by the display of the electronic device 101 based on the metadata. However, when the color gamut of the first image is the same as the color gamut supported by the display of the electronic device 101, the processor 120 may not perform the color gamut conversion operation.

In an embodiment, the processor 120 may perform an inverse transform of an OETF applied to a mastering operation of the first image using an EOFT. For example, the processor 120 may determine a transform function (e.g., PQ gamma or HLG gamma) based on the metadata. The processor 120 may perform the inverse transform using the transform function.

In an embodiment, the processor 120 may obtain the second image by performing HDR processing including tone mapping on the third image.

In an embodiment, the processor 120 may display the second image on the display.

In an embodiment, an image to be displayed on the display may be an image to which HDR or standard dynamic range (SDR) is applied.

In an embodiment, the processor 120 may display the second image in a full screen, a pop-up window, or a multi-window on the display.

Figure 6:
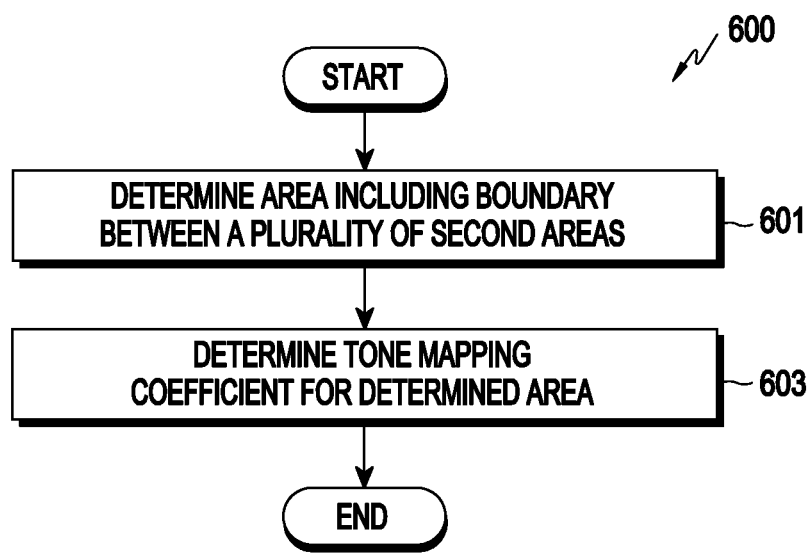
FIG. 6 is a flowchart illustrating a method of performing tone mapping on a specified area, according to various embodiments.

FIG. 6 is a flowchart 600 illustrating a method of performing tone mapping on a specified area according to various embodiments.

Figure 7:
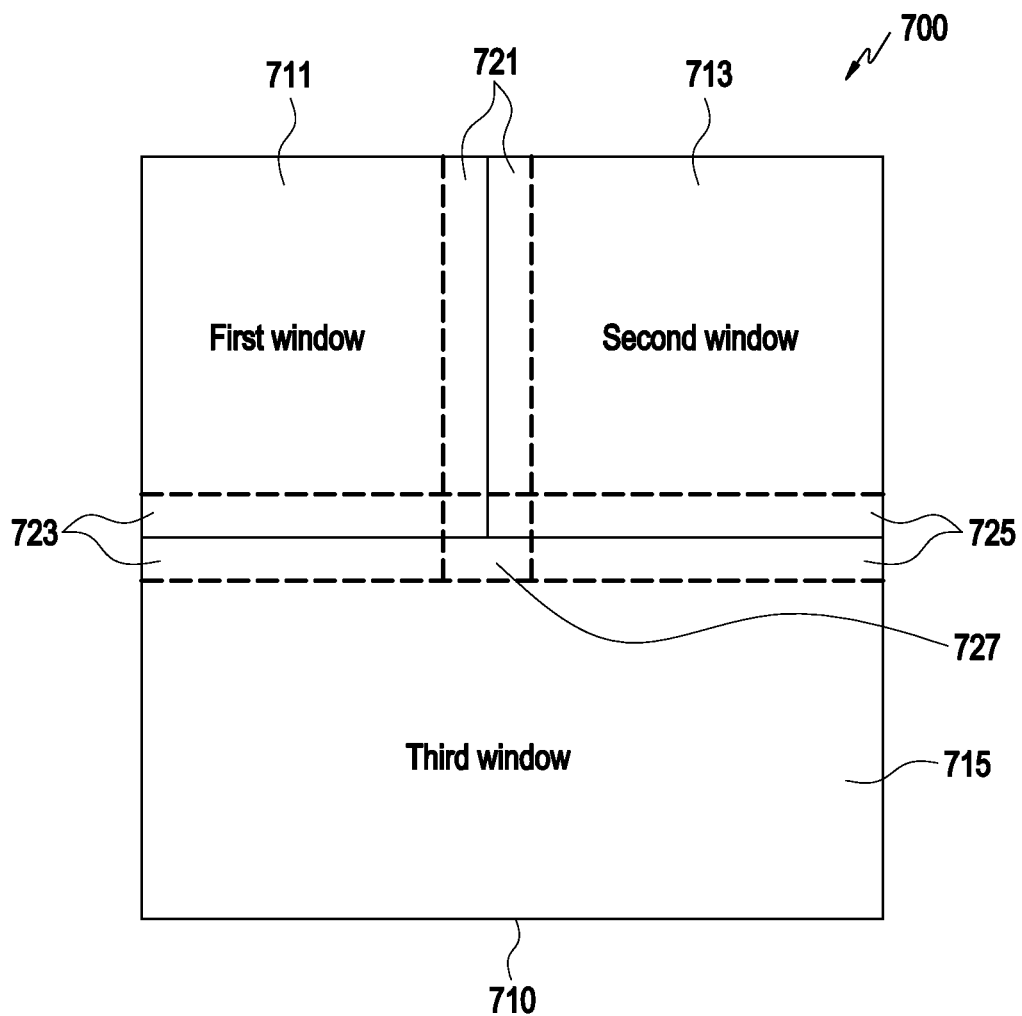
FIG. 7 is an exemplary diagram illustrating a method of performing tone mapping on a specified area, according to various embodiments.

FIG. 7 is an exemplary diagram 700 illustrating a method of performing tone mapping on a specified area according to various embodiments.

Referring to FIGS. 6 and 7, in an embodiment, the processor 120 may determine an area (hereinafter, referred to as a "specified area") including a boundary between a plurality of second areas in operation 601.

In an embodiment, the processor 120 may determine the specified area based on the positions of the plurality of second areas.

In an embodiment, the processor 120 may determine an overlapping area between the plurality of second areas as the specified area. For example, as shown in FIG. 7, when a plurality of second areas in an image frame 710 include a first window 711, a second window 713, and a third window 715, an overlapping area 721 between the first window 711 and the second window 713 may be determined as a first specified area, an overlapping area 723 between the first window 711 and the third window 715 may be determined as a second specified area, an overlapping area 725 between the second window 713 and the third window 715 may be determined as a third specified area, and an overlapping area 727 among the first window 711, the second window 713, and the third window 715 may be determined as a fourth specified area.

In an embodiment, when the plurality of second areas contact each other (e.g., when the boundaries of the plurality of second areas contact each other), the processor 120 may determine an area including the contacting boundaries as a specified area. For example, when the boundaries of the plurality of second areas contact each other, the processor 120 may determine, as the specified area, an area formed by lines spaced apart from the contacting boundaries by a specified distance.

In an embodiment, the processor 120 may determine a tone mapping coefficient for the determined area (e.g., the specified area) in operation 603.

In an embodiment, the processor 120 may determine the tone mapping coefficient to be applied to the specified area using tone mapping coefficients corresponding to areas including the determined area among the plurality of second areas.

In an embodiment, the processor 120 may determine an average value of the tone mapping coefficients corresponding to the areas including the determined area among the plurality of second areas as the tone mapping coefficient to be applied to the specified area. For example, when the specified area is the overlapping area 721 between the first window 711 and the second window 713, the processor 120 may determine an average value of a first tone mapping coefficient corresponding to the first window 711 and a second tone mapping coefficient corresponding to the second window 713 as a tone mapping coefficient to be applied to the area 721. In another example, when the specified area is the overlapping area 727 among the first window 711, the second window 713, and the third window 714, the processor 120 may determine an average value of the first tone mapping coefficient corresponding to the first window 711, the second tone mapping coefficient corresponding to the second window 713, and a third tone mapping coefficient corresponding to the third window 715 as a tone mapping coefficient to be applied to the area 727.

In an embodiment, the processor 120 may determine a tone mapping coefficient to be applied to a specified area based on a weight. For example, the processor 120 may assign a higher (e.g., larger) weight to the first tone mapping coefficient corresponding to the first window 711 for a part closer (e.g., nearer) to the first window 711 (e.g., the center of the first window 711) and a higher (e.g., larger) weight to the second tone mapping coefficient corresponding to the second window 713 for a part closer (e.g., nearer) to the second window 713 (e.g., the center of the second window 713), among parts of the specified area including the boundary of the first window 711 and the boundary of the second window. The processor 120 may determine the tone mapping coefficient to be applied to the specified area by combining (e.g., summing) the weighted first and second tone mapping coefficients.

Although FIG. 6 illustrates that the processor 120 determines a specified area and a tone mapping coefficient for the specified area, the present disclosure is not limited in this regard. For example, the processor 120 may include information about the specified area and information about a method of determining a tone mapping coefficient for a specified area in metadata related to the first image. The processor 120 may determine the specified area based on the information about the specified area and the method of determining a tone mapping coefficient for a specified area, included in the metadata, and determine the tone mapping coefficient to be applied to the specified area using the method of determining a tone mapping coefficient for a specified area.

As a tone mapping coefficient is determined (and/or adjusted) for a specified area including a boundary between a plurality of second areas as described above, a sense of heterogeneity or artifact that may occur in the specified area including the boundary between the plurality of second areas may be minimized.

Figure 8:
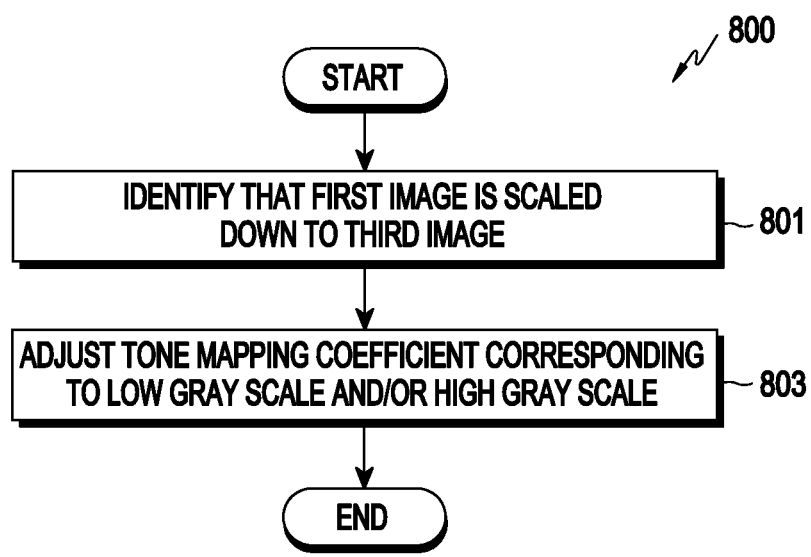
FIG. 8 is a flowchart illustrating a method of performing tone mapping in the case of image scale-down, according to various embodiments.

FIG. 8 is a flowchart 800 illustrating a method of performing tone mapping in the case of image scale-down according to various embodiments.

FIG. 9 is an exemplary diagram 900 illustrating a method of performing tone mapping in the case of image scale-down according to various embodiments.

Referring to FIGS. 8 and 9, in an embodiment, the processor 120 may identify that a first image is scaled down to a third image in operation 801. For example, the processor 120 may identify that the third image is obtained by scaling down the first image based on a scale-up/scale-down ratio.

In an embodiment, the processor 120 may adjust a tone mapping coefficient corresponding to a low gray scale and/or a high gray scale in operation 803.

In an embodiment, when identifying that the first image is scaled down to the third image, the processor 120 may adjust the value of a tone mapping coefficient corresponding to the low gray scale of each of a plurality of second areas (e.g., data for the plurality of second areas) to a value smaller than the value of the tone mapping coefficient corresponding to the low gray scale, and adjust the value of a tone mapping coefficient corresponding to the high gray scale of each of the plurality of second areas to a value greater than the value of the tone mapping coefficient corresponding to the high gray scale, in each of tone mapping coefficients corresponding to the plurality of second areas of the third image, respectively. For example, in graph 910 of FIG. 9, lines 911 and 913 may indicate tone mapping coefficients (e.g., tone mapping coefficients included in metadata) before tone mapping coefficient adjustment. For example, the lines 911 and 913 may represent the tone mapping coefficient of at least one of a plurality of first areas (and a plurality of second areas). The line 911 may be a linear line from a position with a smallest input luminance to a knee point. The line 913 may be a non-linear line (e.g., a Bezier curve) from the knee point to a position with a largest input luminance. In graph 920 of FIG. 9, lines 921 and 923 may indicate tone mapping coefficients after the tone mapping coefficient adjustment. The processor 120 may set the value of the tone mapping coefficient corresponding to the low gray scale of the third image to a value smaller than the value of the tone mapping coefficient to the low gray scale of the first image, included in the metadata, such as the line 921 having a smaller tone mapping coefficient than that of the line 911. The processor 120 may set the value of the tone mapping coefficient corresponding to the high gray scale of the third image to a value greater than the value of the tone mapping coefficient to the high gray scale of the first image, included in the metadata, such as the line 923 having a greater tone mapping coefficient than that of the line 913.

In an embodiment, a third image corresponding to the low gray scale (e.g., an area corresponding to the low gray scale in each of the plurality of second areas) may be part of the third image corresponding to an input luminance range from an input luminance at a smallest input-luminance position to an input luminance at the knee point, as illustrated in FIG. 9. In an embodiment, a third image corresponding to the high gray scale may be part of the third image corresponding to an input luminance range from the input luminance at the knee point to an input luminance at a largest input-luminance position, as further illustrated in FIG. 9.

In an embodiment, the third image corresponding to the low gray scale may be part of the third image corresponding to a color depth range from a minimum value to a median value of the color depth of the third image (e.g., the color depth of an HDR image). In an embodiment, the third image corresponding to the high gray scale may be part of the third image corresponding to a color depth range from the median value to a maximum value of the color depth of the third image.

In an embodiment, when identifying that the first image is scaled down to the third image, as the scale-up/scale-down ratio is smaller, the processor 120 may set the value of the tone mapping coefficient corresponding to the low gray scale of the third image to a value smaller than the value of the tone mapping coefficient corresponding to the low gray scale of the first image, included in the metadata, and set the value of the tone mapping coefficient corresponding to the high gray scale of the third image to a value greater than the value of the tone mapping coefficient corresponding to the high gray scale of the first image, included in the metadata. For example, when the scale-up/scale-down ratio is 0.25 (e.g., when the size of the second image is ¼ of the size of the first image), the processor 120 may set the value of the tone mapping coefficient corresponding to the low gray scale of the third image to a smaller value, and the value of the tone mapping coefficient corresponding to the high gray scale of the third image to a greater value, compared to when the scale-up/scale-down ratio is 0.5 (e.g., when the size of the second image is ½ of the size of the first image).

In an embodiment, when the first image is scaled up to the third image, the processor 120 may not adjust the tone mapping coefficients.

In an embodiment, when the first image is scaled up to the third image, the processor 120 may set the value of the tone mapping coefficient corresponding to the low gray scale of the third image to a value greater than the value of the tone mapping coefficient corresponding to the low gray scale of the first image, included in the metadata, and set the value of the tone mapping coefficient corresponding to the high gray scale of the third image to a value smaller than the value of the tone mapping coefficient corresponding to the high gray scale of the first image, included in the metadata.

In an embodiment, when identifying that the first image is scaled up to the third image, as the scale-up/scale-down ratio is greater, the processor 120 may set the value of the tone mapping coefficient corresponding to the low gray scale of the third image to a value greater than the value of the tone mapping coefficient corresponding to the low gray scale of the first image, included in the metadata, and set the value of the tone mapping coefficient corresponding to the higher gray scale of the third image to a value smaller than the value of the tone mapping coefficient corresponding to the high gray scale of the first image, included in the metadata. A method of adjusting a tone mapping coefficient based on a scale-up/scale-down ratio by the processor 120 may be expressed as Equation 1 below.

$$TMCA_{LOW} = A \times \frac{TMC_{LOW}}{SR} \quad \text{[Equation 1]}$$

$$TMCA_{HIGH} = B \times \frac{TMC_{HIGH}}{SR}$$

Referring to Equation 1, $TMC_{LOW}$ may represent the tone mapping coefficient corresponding to low gray scale before adjustment, $TMCA_{LOW}$ may represent the tone mapping coefficient corresponding to low gray scale after adjustment, $TMC_{HIGH}$ may represent the tone mapping coefficient corresponding to high gray scale before adjustment, TMCA- $_{HIGH}$ may represent the tone mapping coefficient corresponding to high gray scale after adjustment, SR may represent the scale-up/scale-down ratio, and A and B may represent weights for tone mapping coefficients related to the scale-up/scale-down ratio.

In an embodiment, when the first image is scaled down to the third image, the value of the tone mapping coefficient corresponding to the low gray scale of the third image may be set to a value smaller than the value of the tone mapping corresponding to the low gray scale of the first image, included in the metadata, and the value of the tone mapping coefficient corresponding to the high gray scale of the third image may be set to a value greater than the value of the tone mapping coefficient corresponding to the high gray scale of the first image, included in the metadata, a dark area may be displayed darker and a bright area may be displayed brighter in an image. As a result, the contrast of the image may be improved.

Figure 10:
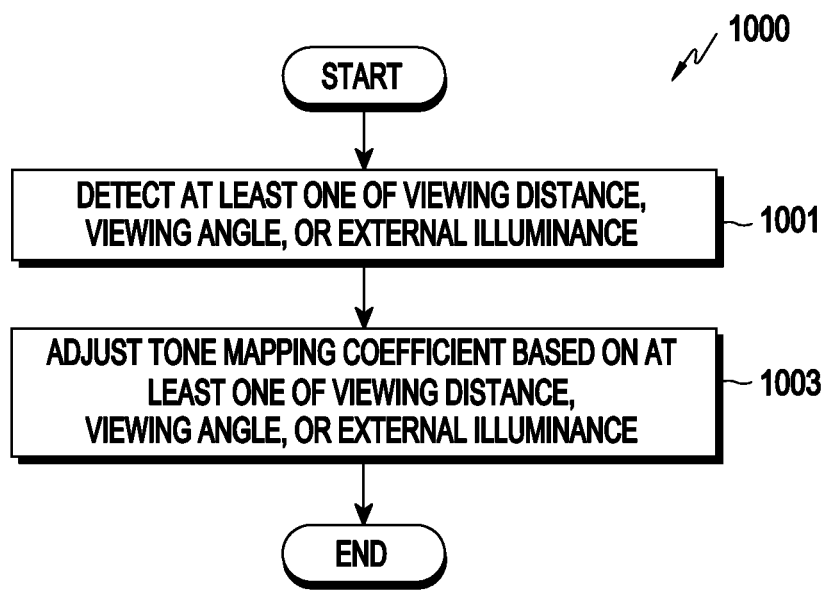
FIG. 10 is a flowchart illustrating a method of performing tone mapping based on at least one of a viewing distance, a viewing angle, or an external illuminance, according to various embodiments.

FIG. 10 is a flowchart 1000 illustrating a method of performing tone mapping based on at least one of a viewing distance, a viewing angle, or an external illuminance according to various embodiments.

Figure 11:
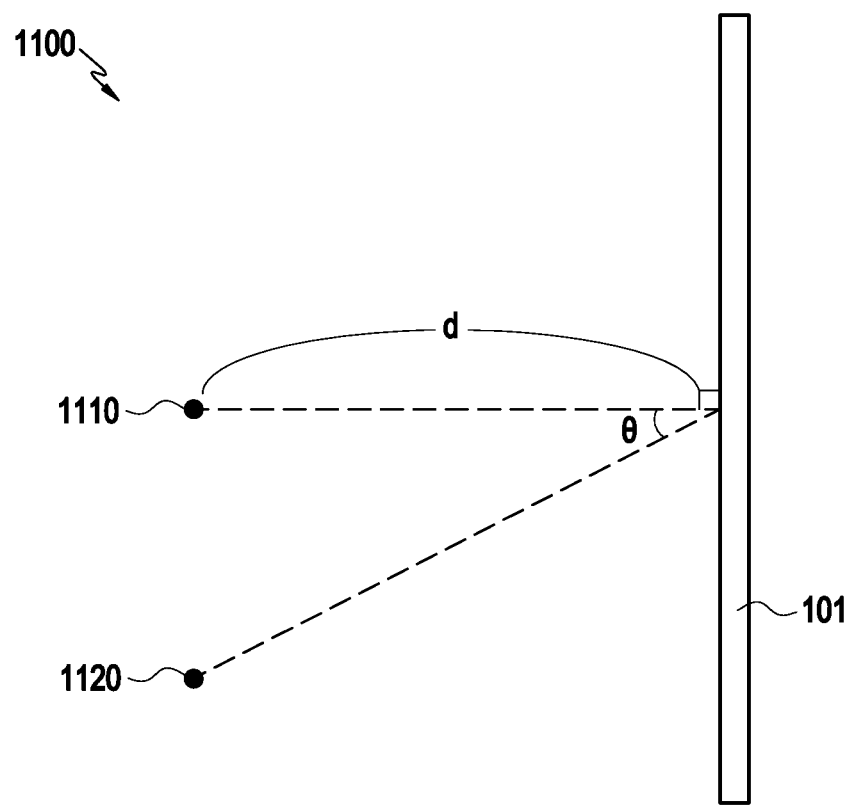
FIG. 11 is an exemplary diagram illustrating a method of performing tone mapping based on at least one of a viewing distance, a viewing angle, or an external illuminance, according to various embodiments.

FIG. 11 is an exemplary diagram 1100 illustrating a method of performing tone mapping based on at least one of a viewing distance, a viewing angle, or an external illuminance according to various embodiments.

Referring to FIGS. 10 and 11, in an embodiment, the processor 120 may detect at least one of a viewing distance, a viewing angle, or an external illuminance through a sensor (e.g., the sensor module 176) in operation 1001.

In an embodiment, the processor 120 may detect a viewing distance between a user and the electronic device 101 through a sensor (e.g., the camera module 180 or a proximity sensor). For example, as illustrated in FIG. 11, the processor 120 may detect a distance between a first position 1110 of the user and the electronic device 101 through the sensor.

In an embodiment, the processor 120 may detect a viewing angle through a sensor (e.g., the camera module 180 or an IR sensor). In an embodiment, the viewing angle may refer to an angle formed by a line based on the user's line of sight and a line perpendicular to a surface of the display of the electronic device 101 and passing through the center of the display. In FIG. 11, for example, the viewing angle may be zero (0) degrees when the user is at the first position 1110 (e.g., when the line based on the user's line of sight coincides with the line perpendicular to the surface of the display of the electronic device 101 and passing through the center of the display), and θ degrees when the user is at a second position 1120.

In an embodiment, the processor 120 may detect an external illuminance of the electronic device 101 through a sensor (e.g., an illuminance sensor).

In an embodiment, the processor 120 may adjust a tone mapping coefficient based on at least one of the viewing distance, the viewing angle, or the external illuminance in operation 1003.

For example, as the viewing distance increases, the processor 120 may set the value of a tone mapping coefficient corresponding to the low gray scale of a third image (e.g., each of a plurality of second areas) to a value smaller than the value of a tone mapping coefficient corresponding to the low gray scale of a first image, included in metadata, and set the value of a tone mapping coefficient corresponding to the high gray scale of the third image to a value greater than the value of a tone mapping coefficient corresponding to the high gray scale of the first image, included in the metadata. As the viewing distance decreases, the processor 120 may set the value of the tone mapping coefficient corresponding to the low gray scale of the third image to a value greater than the value of the tone mapping coefficient corresponding to the low gray scale of a first image, included in the metadata, and set the value of the tone mapping coefficient corresponding to the high gray scale of the third image to a value smaller than the value of the tone mapping coefficient corresponding to the high gray scale of the first image, included in the metadata. A method of adjusting a tone mapping coefficient based on a viewing distance by the processor 120 may be expressed as Equation 2 below.

$$TMCA_{LOW} = C \times \frac{TMC_{LOW}}{d} \quad \text{[Equation 2]}$$
$$TMCA_{HIGH} = D \times \frac{TMC_{HIGH}}{d}$$

Referring to Equation 2, d may represent a detected viewing distance with respect to reference viewing distance, and C and D may represent weights for tone mapping coefficients related to the viewing distance. In Equation 2, the reference viewing distance may be a specified distance serving as a reference for the viewing distance.

In another example, as the viewing angle increases, the processor 120 may set the value of the tone mapping coefficient corresponding to the low gray scale of the third image to a value smaller than the value of a tone mapping coefficient corresponding to the low gray scale of the first image, included in the metadata, and set the value of the tone mapping coefficient corresponding to the high gray scale of the third image to a value greater than the value of the tone mapping coefficient corresponding to the high gray scale of the first image, included in the metadata. Alternatively or additionally, as the viewing angle decreases, the processor 120 may set the value of the tone mapping coefficient corresponding to the low gray scale of the third image to a value greater than the value of the tone mapping coefficient corresponding to the low gray scale of the first image, included in the metadata, and set the value of the tone mapping coefficient corresponding to the high gray scale of the third image to a value smaller than the value of the tone mapping coefficient corresponding to the high gray scale of the first image, included in the metadata. A method of adjusting a tone mapping coefficient based on a viewing angle by the processor 120 may be expressed as Equation 3 below.

$$TMCA_{LOW} = E \times \frac{TMC_{LOW}}{\theta} \quad \text{[Equation 3]}$$
$$TMCA_{HIGH} = F \times \frac{TMC_{HIGH}}{\theta}$$

Referring to Equation 3, θ may represent a viewing angle, and E and F may represent tone mapping coefficients and weights related to the viewing angle.

In another example, as the external illuminance increases (e.g., an external environment is bright), the processor 120 may set the value of the tone mapping coefficient corresponding to the low gray scale of the third image to a value smaller than the value of the tone mapping coefficient corresponding to the low gray scale of the first image, included in the metadata, and set the value of the tone mapping coefficient corresponding to the high gray scale of the third image to a value greater than the value of the tone mapping coefficient corresponding to the high gray scale of the first image, included in the metadata. Alternatively or additionally, as the external illuminance decreases, the processor 120 may set the value of the tone mapping coefficient corresponding to the low gray scale of the third image to a value greater than the value of the tone mapping coefficient corresponding to the low gray scale of the first image, included in the metadata, and set the value of the tone mapping coefficient corresponding to the high gray scale of the third image to a value smaller than the value of the tone mapping coefficient corresponding to the high gray scale of the first image, included in the metadata. A method of adjusting a tone mapping coefficient based on an external illuminance by the processor 120 may be expressed as Equation 4 below.

$$TMCA_{LOW} = G \times \frac{TMC_{LOW}}{LX} \quad \text{[Equation 4]}$$
$$TMCA_{HIGH} = H \times \frac{TMC_{HIGH}}{LX}$$

Referring to Equation 4, LX may represent an external illuminance with respect to a reference illuminance, and G and H may represent weights of tone mapping coefficients related to external illuminance. In Equation 4, the reference illuminance may be a designated illuminance as a standard for external illuminance.

In an embodiment, the processor 120 may specify at least one of weights A to H of Equations 1 to 4 based on an input (e.g., a user input).

While the processor 120 is shown in FIG. 10 as setting the weights A to H related to tone mapping coefficients and adjusting the tone mapping coefficients using equations related to the tone mapping coefficients (e.g., Equations 1 to 4), the present disclosure is not limited in this regard. For example, information about the weights related to the tone mapping coefficients and the equations related to the tone mapping coefficients may be included in the metadata related to the first image obtained by the processor 120. That is, the processor 120 may adjust the tone mapping coefficients based on the information about the weights related to the tone mapping coefficients and the equations related to the tone mapping coefficients in the metadata.

In an embodiment, the processor 120 may improve the contrast of the image by adjusting the tone mapping coefficients based on at least one of the viewing distance, the viewing angle, or the external illuminance. For example, as the viewing distance increases, the viewing angle increases, or the external illuminance increases, image quality may be poorer. When the viewing distance is greater than the reference viewing distance, the viewing angle is large, or the external illuminance is greater than the reference illuminance, the processor 120 may adjust the tone mapping coefficient corresponding to the low gray scale of the third image to be small and adjust the tone mapping coefficient corresponding to the high gray scale of the third image to be large, thereby obtaining an image with improved quality.

Figure 12:
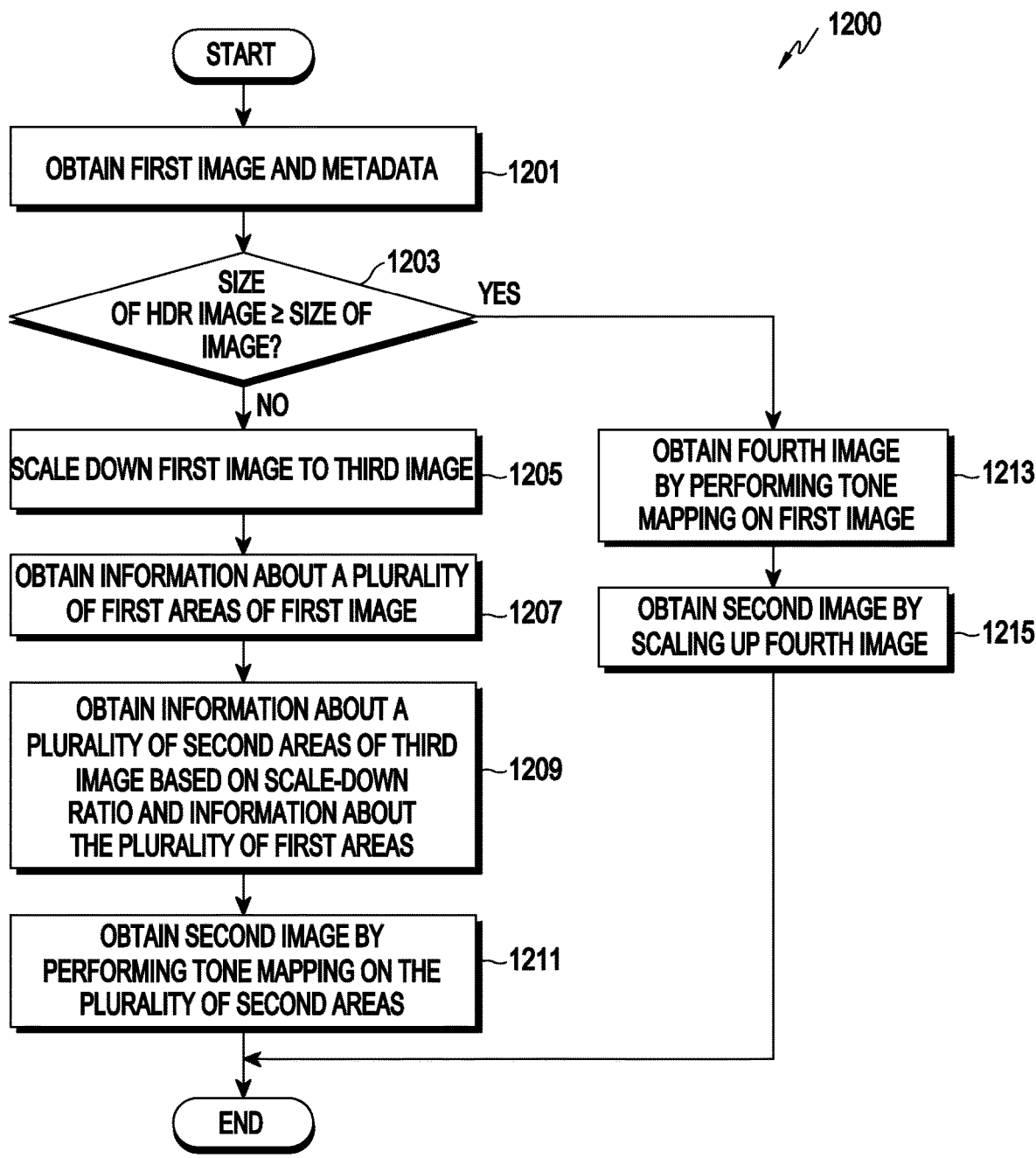
FIG. 12 is a flowchart illustrating a method of performing scale-up/scale-down and tone mapping according to a scale-up/scale-down ratio, according to various embodiments.

FIG. 12 is a flowchart 1200 illustrating a method of performing scale-up/scale-down and tone mapping according to an scale-up/scale-down ratio according to various embodiments.

Referring to FIG. 12, in an embodiment, the processor 120 may obtain a first image and metadata in operation 1201.

Operation 1201 may include or may be similar in many respects to operation 401 of FIG. 4, as such, the above description with reference to FIG. 4 may apply to operation 1201. Thus, a repeated description is avoided for the sake of brevity.

In an embodiment, the processor 120 may determine whether the size of a second image is greater than or equal to the size of the first image in operation 1203. For example, the processor 120 may determine whether the size of the second image to be displayed on the display is greater than or equal to the size of the first image before a scale-up/scale-down operation.

In an embodiment, when determining that the size of the first image is smaller than the size of the second image in operation 1203 (NO in operation 1203), the processor 120 may scale down the first image to a third image in operation 1205.

In an embodiment, information about a plurality of first areas of the first image corresponding to a plurality of tone mapping coefficients may be obtained based on the metadata in operation 1207.

In an embodiment, the processor 120 may obtain information about a plurality of second areas of the third image based on a scale-down ratio (e.g., a ratio at which the first image is scaled down to the third image) and information about the plurality of first areas in operation 1209.

In an embodiment, the processor 120 may obtain the second image by performing tone mapping on the plurality of second areas in operation 1211.

Operations 1205 to 1211 may include or may be similar in many respects to operations 403 to 409 of FIG. 4, as such, the above description with reference to FIG. 4 may apply to operations 1205 to 1211. Thus, a repeated description is avoided for the sake of brevity.

In an embodiment, when determining that the size of the second image is greater than or equal to the size of the first image in operation 1203 (YES in operation 1203), the processor 120 may obtain a fourth image by performing tone mapping on the first image in operation 1213. For example, the processor 120 may obtain the fourth image by performing HDR processing including tone mapping on the first image.

In an embodiment, the processor 120 may obtain the second image by scaling up the fourth image (e.g., based on a ratio at which the first image is scaled up to the second image) in operation 1215.

In an embodiment, the processor 120 may display the second image on the display.

In an embodiment, the processor 120 may perform the HDR processing before the image scale-up when the scale-up/scale-down ratio is one (1) or greater (e.g., ratio ≥1), and perform the image scale-up before the HDR processing when the scale-up/scale-down ratio is less than one (1) (e.g., ratio <1). Therefore, power consumption may be reduced.

Figure 13:
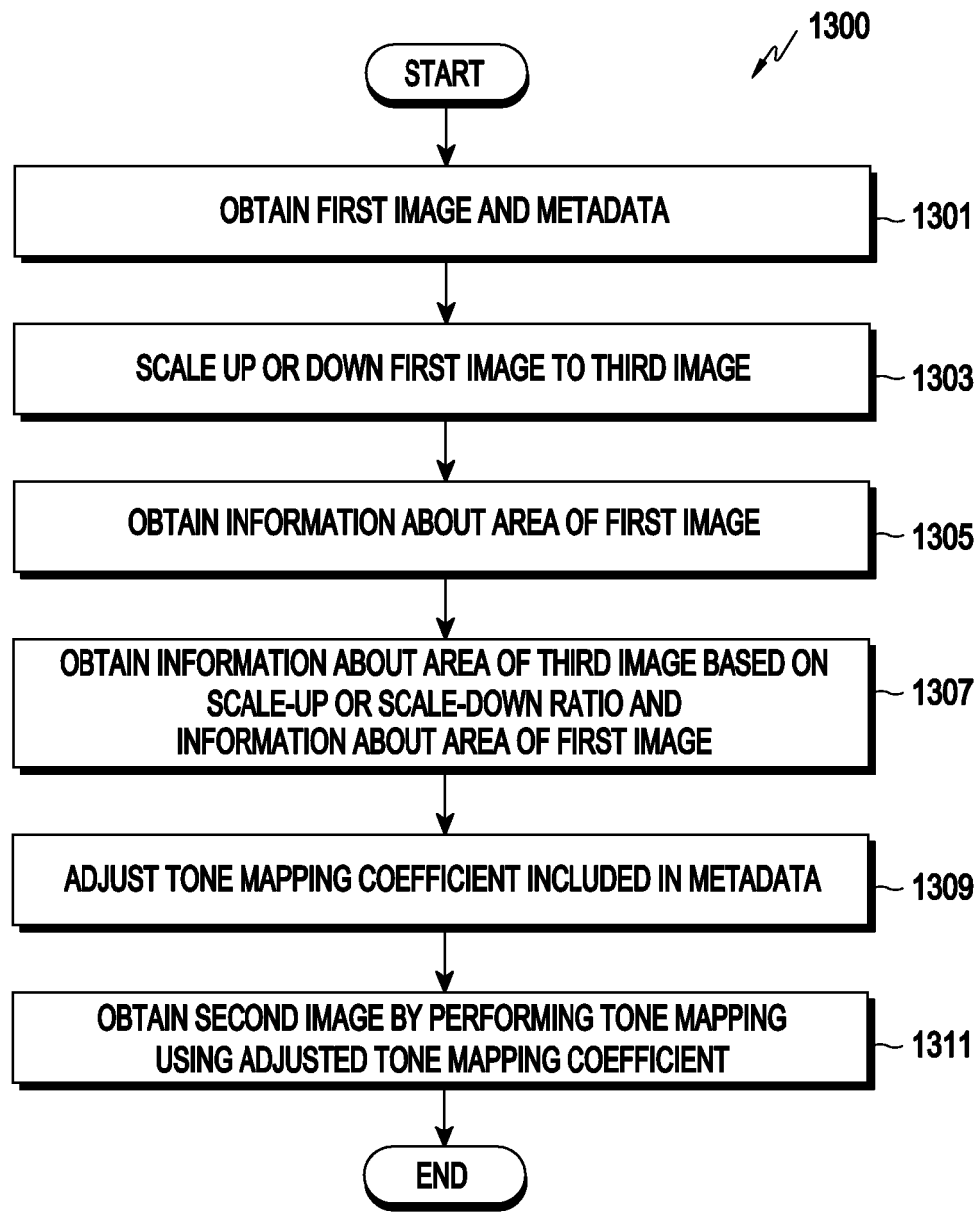
FIG. 13 is a flowchart illustrating a method of providing an image, according to various embodiments.

FIG. 13 is a flowchart illustrating a method of providing an image according to various embodiments.

Referring to FIG. 13, in an embodiment, the processor 120 may obtain a first image and metadata in operation 1301.

In an embodiment, the processor 120 may obtain an HDR image signal including an encoded first image and metadata from the outside (e.g., user, camera module, external electronic device, server).

In an embodiment, the HDR image signal may be obtained through the camera module 180. In an embodiment, the HDR image signal may be obtained from an external electronic device (e.g., the server 108) or another electronic device (e.g., the electronic device 102 or the electronic device 104).

In an embodiment, the processor 120 may obtain the first image by performing decoding using a decoding scheme corresponding to an encoding scheme of the first image.

In an embodiment, the metadata may include dynamic metadata.

In an embodiment, data for tone mapping may include the position (e.g., coordinates) of at least one area set in a frame of the first image (e.g., one frame of the first image) and a tone mapping coefficient corresponding to each of the at least one area.

In an embodiment, the processor 120 may scale up or down the first image to a third image in operation 1303.

In an embodiment, operation 1303 may include or may be similar in many respects to operation 403 of FIG. 4, as such, the above description with reference to FIG. 4 may apply to operations 1303. Thus, a repeated description is avoided for the sake of brevity.

According to an embodiment, the processor 120 may obtain information about areas of the first image in operation 1305. For example, when the first image includes a plurality of areas, the processor 120 may obtain information about the position of each of the plurality of areas based on the metadata. Alternatively or additionally, when the first image includes a single area (e.g., when the area of the first image is the entire area of an image frame or a background area of the image frame) based on the metadata, the metadata may not include information about the position of the single area of the first image, and the processor 120 may identify the information about the position of the single area of the first area from data of the first image.

In an embodiment, the processor 120 may obtain information about an area of the third image based on a scale-up/scale-down ratio and the information about the area of the first image in operation 1307. For example, when the first image includes a plurality of areas, the processor 120 may change the positions of the plurality of first areas to the positions of a plurality of second areas using the scale-up/scale-down ratio. Alternative or additional examples of changing the positions of a plurality of first areas to the positions of a plurality of second areas using a scale-up/scale-down ratio in the case of a plurality of areas in a first image are described above with reference to FIG. 5 and, thus, a repeated description is not provided for the sake of brevity.

In another example, when the first image includes a single first area, the processor 120 may obtain information about the area of the third image to which the first image is scaled up or down using the scale-up/scale-down ratio without using the information about the single area of the first image.

In an embodiment, the processor 120 may adjust a tone mapping coefficient included in the metadata in operation 1309.

In an embodiment, when the first image includes a single area, the processor 120 may adjust a first value of a tone mapping coefficient (hereinafter, referred to as a "first value") corresponding to a low gray scale and/or a second value (hereinafter, referred to as a "second value") corresponding to a high gray scale in the tone mapping coefficient included in the metadata.

For example, when identifying that the first image includes a single area and is scaled down to the third image, the processor 120 may adjust the first value to a value smaller than the first value and the second value to a value greater than the second value.

In another example, when identifying that the first image includes a single area and is scaled down to the third image, the processor 120 may adjust the first value to a smaller value and the second value to a greater value, as the scale-up/scale-down ratio decreases.

In another example, when the first image includes a single area and is scaled up to the third image, the processor 120 may not adjust the tone mapping coefficient.

In another example, when the first image includes a single area and is scaled up to the third image, the processor 120 may adjust the first value to a value greater than the first value and the second value to a value smaller than the second value.

In another example, when the first image includes a single area, the processor 120 may adjust the tone mapping coefficient using Equation 1 described above.

In another example, when the first image includes a single area, the processor 120 may adjust the tone mapping coefficient based on at least one of a viewing distance, a viewing angle, or an external illuminance. For example, when the first image includes a single area, the processor 120 may adjust the tone mapping coefficient using at least one of Equations 2 to 4, as described above with respect to operation 1003 of FIG. 10.

In an embodiment, at least some of the examples of the method of adjusting a tone mapping coefficient included in metadata in the case of a plurality of areas in a first image by the processor 120 may include or may be similar in many respects to the examples described before with reference to FIGS. 8 to 11 and, thus, a repeated description is not provided for the sake of brevity.

In operation 1311, the processor 120 may obtain a second image by performing tone mapping using the adjusted tone mapping coefficient.

In an embodiment, the processor 120 may obtain the second image by performing tone mapping on the area of the third image using the tone mapping coefficient including the adjusted first and second values. For example, when the third image includes a single area, the processor 120 may apply the adjusted tone mapping coefficient to the single area of the third image. In another example, at least some of the examples of the method of applying an adjusted mapping coefficient in the case of a plurality of areas in a third image by the processor 120 may include or may be similar in many respects to the examples described above with respect to operation 409 of FIG. 4 and, thus, a repeated description is not provided for the sake of brevity.

In an embodiment, the processor 120 may determine whether the size of the second image is greater than or equal to the size of the first image, and when the size of the second image is greater than or equal to the size of the first image, obtain the third image by performing tone mapping on the first image and obtain the second image by obtaining a fourth image. For example, the processor 120 may perform HDR processing before image scale-up, when the scale-up/scale-down ratio is one (1) or greater (e.g., ratio ≥1), and perform a scale-down operation before HDR processing, when the scale-up/scale-down ratio is less than one (1) (e.g., ratio <1), as described above with reference to FIG. 12. Accordingly, power consumption may be reduced.

Alternatively or additionally, a data structure used in the afore-described embodiments of the present disclosure may be recorded on a computer-readable recording medium through various means. The computer-readable recording medium may include storage mediums such as, but not limited to, a magnetic storage medium (e.g., read only memory (ROM), floppy disk, hard disk, and the like) and/or an optical reading medium (e.g., CD-ROM, digital versatile disk (DVD), and the like).

A computer-readable recording medium recording computer-executable programs may record a program causing the electronic device 101 to obtain a first image, identify a first object in the first image, obtain a parameter related to a zoom area based on movement of the first object in the first image, identify the first object corresponding to a second object included in a second image obtained through the camera module 180 of the electronic device 101, and obtain an image of the second object from the second image based on the parameter related to the zoom area.

The disclosure has been described above in the context of example embodiments. Those skilled in the art will understand that the disclosure can be implemented in a modified form without departing from the essential features of the present disclosure. Therefore, the disclosed embodiments should be considered from an illustrative perspective rather than a restrictive perspective. The scope of the present disclosure is provided in the claims rather than the foregoing description, and all differences within their equivalent scope should be construed as being encompassed in the present disclosure.

What is claimed is:

1. An electronic device comprising:
a display;
at least one processor including processing circuitry; and
memory storing
instructions that, when executed by the at least one processor individually or collectively, cause the electronic device to:
obtain a first image to which high dynamic range (HDR) is applied and metadata corresponding to the first image,
scale up or down, using a scaling ratio based on size information about a first size of the first image and a second size of a second image to be displayed on the display, the first image to a third image,
obtain, based on the metadata, first information about a plurality of first areas of the first image, the first information including first position information about positions of the plurality of first areas,
obtain second information about a plurality of second areas of the third image, based on the scaling ratio and the first information, the plurality of second areas respectively corresponding to the plurality of first areas, the second information including second position information about positions of the plurality of second areas, a plurality of tone mapping coefficients included in the metadata respectively corresponding to the plurality of first areas, the plurality of tone mapping coefficients respectively corresponding to the plurality of second areas, and
obtain the second image by performing tone mapping on the plurality of second areas using the plurality of tone mapping coefficients respectively corresponding to the plurality of second areas.

2. The electronic device of claim 1, wherein the instructions to instructions, when executed by the at least one processor individually or collectively, further cause the electronic device to:
change, based on the scaling ratio, the positions of the plurality of first areas to the positions of the plurality of second areas, respectively.

3. The electronic device of claim 1, wherein the instructions, when executed by the at least one processor individually or collectively, further cause the electronic device to:
determine a boundary area comprising a boundary between the plurality of second areas, and
determine a boundary tone mapping coefficient to be applied to the boundary area, based on respective tone mapping coefficients corresponding to the plurality of second areas, wherein one or more second areas of the plurality of second areas comprise the boundary area.

4. The electronic device of claim 3, wherein the instructions, when executed by the at least one processor individually or collectively, further cause the electronic device to:
determine an average value of tone mapping coefficients corresponding to the one or more second areas as the boundary tone mapping coefficient.

5. The electronic device of claim 1, wherein the instructions, when executed by the at least one processor individually or collectively, further cause the electronic device to:
adjust a tone mapping coefficient value of the plurality of tone mapping coefficients corresponding to a low gray scale to a smaller value corresponding to the low gray scale, and
adjust a tone mapping coefficient value of the plurality of tone mapping coefficients corresponding to a high gray scale to a larger value corresponding to the high gray scale.

6. The electronic device of claim 1, wherein the instructions, when executed by the at least one processor individually or collectively, further cause the electronic device to:
detect at least one of a viewing distance, a viewing angle, or an external illuminance, and
adjust each of the plurality of tone mapping coefficients based on the at least one of the viewing distance, the viewing angle, or the external illuminance.

7. The electronic device of claim 1, wherein the instructions, when executed by the at least one processor individually or collectively, further cause the electronic device to:
determine whether the second size of the second image is greater than or equal to the first size of the first image,
based on a determination that the second size is greater than or equal to the first size, obtain a fourth image by performing tone mapping on the first image, and
obtain the second image by scaling up the fourth image.

8. A method of providing an image by an electronic device, the method comprising:
obtaining a first image to which high dynamic range (HDR) is applied and metadata corresponding to the first image;
scaling up or down, using a scaling ratio based on size information about a first size of the first image and a second size of a second image to be displayed on a display of the electronic device, the first image to a third image;
obtaining, based on the metadata, first information about a plurality of first areas of the first image, the first information including first position information about positions of the plurality of first areas;
obtaining second information about a plurality of second areas of the third image, based on the scaling ratio and the first information, the plurality of second areas respectively corresponding to the plurality of first areas, the second information including second position information about positions of the plurality of second areas, a plurality of tone mapping coefficients included in the metadata respectively corresponding to the plurality of first areas, the plurality of tone mapping coefficients respectively corresponding to the plurality of second areas; and obtaining the second image by performing tone mapping on the plurality of second areas using the plurality of tone mapping coefficients respectively corresponding to the plurality of second areas.

9. The method of claim 8, wherein the obtaining the second information comprises changing, based on the scaling ratio, the positions of the plurality of first areas to the positions of the plurality of second areas, respectively.

10. The method of claim 8, further comprising:
determining a boundary area comprising a boundary between the plurality of second areas; and
determining a boundary tone mapping coefficient to be applied to the boundary area, based on respective tone mapping coefficients corresponding to the plurality of second areas.

11. The method of claim 10, wherein one or more second areas of the plurality of second areas comprise the boundary area, and
wherein the determining the boundary tone mapping coefficient comprises determining an average value of tone mapping coefficients corresponding to the one or more second areas as the boundary tone mapping coefficient.

12. The method of claim 8, wherein the scaling the first image comprises:
adjusting a tone mapping coefficient value of the plurality of tone mapping coefficients corresponding to a low gray scale to a smaller value corresponding to the low gray scale; and
adjusting a tone mapping coefficient value of the plurality of tone mapping coefficients corresponding to a high gray scale to a larger value corresponding to the high gray scale.

13. The method of claim 8, further comprising:
detecting at least one of a viewing distance, a viewing angle, or an external illuminance; and
adjusting each of the plurality of tone mapping coefficients based on the at least one of the viewing distance, the viewing angle, or the external illuminance.

14. The method of claim 8, further comprising:
determining whether the second size of the second image is greater than or equal to the first size of the first image;
based on determining that the second size is greater than or equal to the first size, obtaining a fourth image by performing tone mapping on the first image; and
obtaining the second image by scaling up the fourth image.

* * * * *